United States Patent
Liu

(10) Patent No.: US 9,883,020 B2
(45) Date of Patent: Jan. 30, 2018

(54) CUSTOMIZED METHOD AND APPARATUS FOR CONTROLLING ELECTRIC APPLIANCE

(71) Applicant: ZTE CORPORATION, Shenzhen, Guangdong Province (CN)

(72) Inventor: An Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/320,246

(22) PCT Filed: Aug. 25, 2014

(86) PCT No.: PCT/CN2014/085107
§ 371 (c)(1),
(2) Date: Dec. 19, 2016

(87) PCT Pub. No.: WO2015/192469
PCT Pub. Date: Dec. 23, 2015

(65) Prior Publication Data
US 2017/0163789 A1    Jun. 8, 2017

(30) Foreign Application Priority Data
Jun. 20, 2014    (CN) .......................... 2014 1 0281343

(51) Int. Cl.
*H04M 3/00* (2006.01)
*H04M 1/725* (2006.01)
(Continued)

(52) U.S. Cl.
CPC ... *H04M 1/72533* (2013.01); *H04M 1/72572* (2013.01); *H04W 8/183* (2013.01); *H04L 67/125* (2013.01)

(58) Field of Classification Search
USPC ....... 455/417–422.1, 424–425, 456.1–456.3, 455/466, 550.1–553.1
See application file for complete search history.

(56) References Cited

U.S. PATENT DOCUMENTS 6,400,956 B1 * 6/2002 Richton .................. H04W 4/02
340/988
8,390,432 B2 * 3/2013 Bae .......................... H04Q 9/00
340/10.5

(Continued)

FOREIGN PATENT DOCUMENTS

| CN | 102209159 A | 10/2011 |
|---|---|---|
| CN | 103604191 A | 2/2014 |
| EP | 1998292 A2 | 12/2008 |

OTHER PUBLICATIONS

International Search Report and Written Opinion dated Mar. 18, 2015 for PCT Application No. PCT/CN2014/085107.

(Continued)

*Primary Examiner* — Dai A Phuong
(74) *Attorney, Agent, or Firm* — Plumsea Law Group, LLC

(57) ABSTRACT

A method and apparatus for controlling an electric appliance in a personalized way are disclosed, which relates to the technical field of communications and is used to solve problem of poor user experience of various appliances in a home or office environment in the existing technology. The method includes: detecting whether a wireless signal carrying SIM card information exists in a preset range; in a case that the wireless signal carrying the SIM card information exists, determining a user identity of an SIM card according to the SIM card information; and correspondingly controlling the electric appliance according to the user identity.

9 Claims, 3 Drawing Sheets

(51) Int. Cl.
*H04W 8/18* (2009.01)
*H04L 29/08* (2006.01)

(56) References Cited

U.S. PATENT DOCUMENTS

| | | | | |
|---|---|---|---|---|
| 8,874,170 | B2* | 10/2014 | Benkelberg | G06K 7/0008 455/551 |
| 2003/0139190 | A1* | 7/2003 | Steelberg | G01S 5/02 455/456.1 |
| 2005/0159175 | A1* | 7/2005 | Zhou | G08C 17/02 455/466 |
| 2007/0184851 | A1* | 8/2007 | Barnwell | H04W 64/00 455/456.1 |
| 2011/0244902 | A1* | 10/2011 | Kim | H04W 76/021 455/507 |
| 2011/0309766 | A1* | 12/2011 | Weng | H05B 37/0272 315/287 |
| 2012/0172027 | A1 | 7/2012 | Partheesh et al. | |
| 2013/0260756 | A1* | 10/2013 | Huang | H04W 68/02 455/435.1 |
| 2014/0018055 | A1* | 1/2014 | Majewski | H04W 4/001 455/418 |
| 2014/0045454 | A1* | 2/2014 | Monjas Llorente | H04L 63/0853 455/406 |
| 2014/0227975 | A1* | 8/2014 | Kuroyama | G08C 17/02 455/41.1 |
| 2015/0112667 | A1* | 4/2015 | Kozuka | H04M 1/72533 704/201 |

OTHER PUBLICATIONS

Extended European Search Report dated Jun. 19, 2017 for European Patent Application No. 14895477.9.

* cited by examiner

CUSTOMIZED METHOD AND APPARATUS FOR CONTROLLING ELECTRIC APPLIANCE

CROSS-REFERENCE TO RELATED APPLICATION(S)

This application is the U.S. National Phase application of PCT application number PCT/CN2014/085107 having a PCT filing date of Aug. 25, 2014, which claims priority of Chinese patent application 201410281343.X filed on Jun. 20, 2014, the disclosures of which are hereby incorporated by reference.

TECHNICAL FIELD

The present disclosure relates to the technical field of communications, and in particular, to a method and apparatus for controlling an electric appliance in a personalized way.

BACKGROUND OF RELATED ART

With the development of the industries such as electronics and automobile and the like, people's life quality is also improved at an unprecedented rate, and comfort, convenience and individuation are people's persistent pursuit to their own household arrangements and transportation means.

People arrange their own lives according to their habits and favorites every day, but the user's mood of enjoying life will also be affected if each trifle is repeated for a long time, which cause that the user will not be pleasantly surprised, thereby reducing the user experience.

SUMMARY

The embodiments of the present disclosure provide a method and apparatus for controlling an electric appliance in a personalized way, to solve the problem of poor user experience of various appliances in a home or office environment in the existing technology.

On the one hand, an embodiment of the present disclosure provides a method for controlling an electric appliance in a personalized way including: detecting whether a wireless signal carrying Subscriber Identity Module SIM card information exists in a preset range; in a case that the wireless signal carrying the SIM card information exists, determining a user identity of an SIM card according to the SIM card information; and controlling an electric appliance according to the user identity.

Alternatively, the step of detecting whether a wireless signal carrying SIM card information exists in a preset range includes: detecting whether the wireless signal carrying the SIM card information exists in the preset range by communicating with a base station of a cell; or when the user makes or answer a call, detecting whether the wireless signal carrying the SIM card information exists in the preset range by detecting a communication message transmitted in a wireless channel.

Alternatively, the step of determining a user identity of an SIM card according to the SIM card information in a case that the wireless signal carrying the SIM card information exists includes: determining different user identities corresponding to different SIM cards according to an International Mobile Subscriber Identity IMSI of the SIM card.

Alternatively, the step of correspondingly controlling an electric appliance according to the user identity includes: determining whether the user identity corresponding to the SIM card has been stored in a local user registration form; in a case that the user identity corresponding to the SIM card has been stored in the local user registration form, looking up an electric appliance setting requirement corresponding to the user identity in the user registration form; and controlling a corresponding electric appliance according to the electric appliance setting requirement.

Alternatively, after determining whether the user identity corresponding to the SIM card has been stored in a local user registration form, the method further includes: in a case that the user identity corresponding to the SIM card has not been stored in the local user registration form, prompting a user of the SIM card whether it is required to make a registration in the user registration form.

On the other hand, an embodiment of the present invention further provides a apparatus for controlling an electric appliance in a personalized way further including: a detection unit, arranged to detect whether a wireless signal carrying subscriber identity module SIM card information exists in a preset range; a determination unit, arranged to determine a user identity of an SIM card according to the SIM card information in a case that the wireless signal carrying the SIM card information exists; and a control unit, arranged to control an electric appliance according to the user identity.

Alternatively, the detection unit is arranged to: detect whether the wireless signal carrying the SIM card information exists in the preset range by communicating with a base station of a cell; or when a user makes or answers a call, detect whether the wireless signal carrying the SIM card information exists in the preset range by detecting a communication message transmitted in a wireless channel.

Alternatively, the determination unit is arranged to determine different user identities corresponding to different SIM cards according to an IMSI of the SIM card.

Alternatively, the control unit is arranged to: determine whether the user identity corresponding to the SIM card has been stored in a local user registration form; in a case that the user identity corresponding to the SIM card has been stored in the local user registration form, look up an electric appliance setting requirement corresponding to the user identity in the user registration form; and control a corresponding electric appliance according to the electric appliance setting requirement.

Alternatively, the control unit is further arranged to: in a case that the user identity corresponding to the SIM card has not been stored in the local user registration form, prompt a user of the SIM card whether it is required to make a registration in the user registration form.

The embodiment of the present disclosure further provides a computer program, which includes program instructions, herein, when the program instructions are executed by an SIM card identification device, the SIM card identification device executes the above method.

The embodiment of the present disclosure further provides a carrier carrying the above computer program.

With the method and apparatus for controlling the electric appliance in a personalized way, the computer program and the carrier carrying the computer program, the user identity may be authenticated by using an identity identification function of the SIM card, and the electric appliance may be correspondingly controlled according to different user identities, therefore, when entering a room or car, the user may automatically enjoy his/her own favorite music and lights and the like and enjoy appropriate temperature, which makes people pleased, thereby effectively improving the user experience.

PREFERRED EMBODIMENTS

The embodiments of the present disclosure will be described in detail in combination with the accompanying drawings below. The embodiments in the present disclosure and the characteristics in the embodiments may be arbitrarily combined with each other in the case of no conflict.

Figure 1:
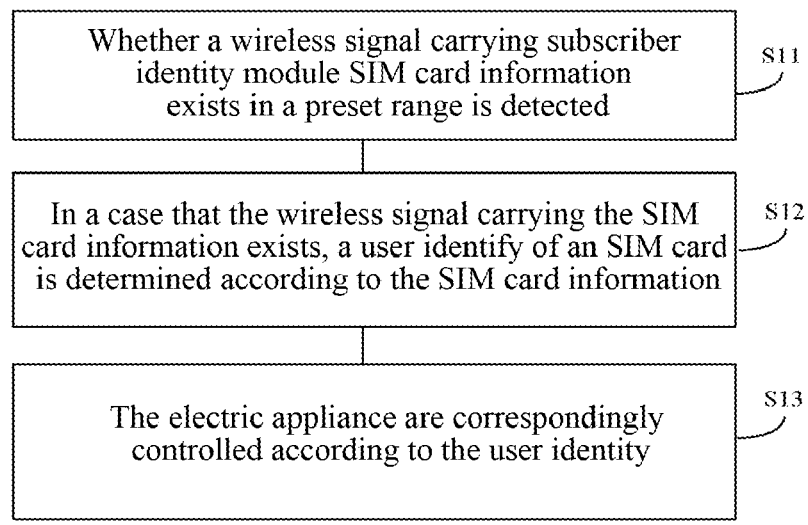
FIG. 1 is a flow chart of a method for controlling an electric appliance in a personalized way provided in an embodiment of the present disclosure.

As shown in FIG. 1, an embodiment of the present disclosure provides a method for controlling an electric appliance in a personalized way, which includes following steps.

In step S11, it is to detect whether a wireless signal carrying subscriber identity module SIM card information exists in a preset range.

In step S12, in a case that the wireless signal carrying the SIM card information exists, it is to determine a user identify of an SIM card according to the SIM card information.

In step S13, it is to correspondingly control the electric appliance according to the user identity.

With the method for controlling the electric appliance in a personalized way provided in the embodiment of the present disclosure, the user identity may be authenticated by using an identity identification function of the SIM card, and the electric appliance may be correspondingly controlled according to different user identities. Therefore, when entering a room or car, the user may automatically enjoy his/her own favorite music and lights and the like and enjoy appropriate temperature, which makes people pleased, thereby effectively improving the user experience.

The SIM card is also called a smart card and a user identification card, and a mobile terminal may only be used after being installed with the card. The SIM card stores contents including information of a digital mobile telephone client, an encrypted key and a telephone directory of the user on a chip, which may be used for authenticating a GSM network client identity and encrypting voice information when the client makes a call. Therefore, the network may determine the user identity of the SIM card when the user makes calls.

In the embodiment, an SIM card identification device installed in a family or in a car may detect whether the wireless signal carrying the SIM card information exists in the preset range (e.g., in a range of one family or in a car and so on), thus the user identity may also be authenticated.

Alternatively, in the step S11, the SIM card identification device may communicate with a base station of a cell to detect whether the wireless signal carrying the SIM card information exists in the preset range. Or, when the user makes or answers calls, the SIM card identification device may also detect a communication message transmitted in a wireless channel to detect whether the wireless signal carrying the SIM card information exists in the preset range. Certainly, detection may also be executed in other ways, which is not limited in the embodiment of the present disclosure.

In the step S12, in a case that the SIM card identification device detects that the wireless signal carrying the SIM card information exists in the preset range, the user identity of the SIM card may be determined according to the SIM card information. For example, different user identities corresponding to different SIM cards may be determined according to an international mobile subscriber identity number of the SIM card or a mobile phone number. Therefore, the SIM card identification device may perform valid authentication on the user identity through the SIM card information, which avoids complicated algorithms such as fingerprint recognition or facial recognition to be used.

After identifying the user identity, in the step S13, the SIM card identification device may correspondingly control the electric appliance according to the user identity. Alternatively, in one embodiment of the present invention, a user registration form may be maintained in the SIM card identification device, and an international mobile subscriber identity number of the SIM card, a real user identity corresponding to the number and various setting requirements of the user identity made for the electric appliance are recorded in the form. After the wireless signal carrying the SIM card information is detected and the user identity corresponding to the SIM card is determined, the user registration form may be queried so as to determine whether the user identity corresponding to the SIM card has been stored in the local user registration form. In a case that the user identity corresponding to the SIM card has been stored in the local user registration form, an electric appliance setting requirement corresponding to the user identity may be looked up in the user registration form, and then a corresponding electric appliance is controlled according to the electric appliance setting requirement.

For example, when a user Mr. P enters his house door, the SIM card identification device installed indoors detects SIM card information of the mobile phone used by Mr. P by communicating with the base station of the cell, and determines that Mr. P is back. And then the SIM card identification device looks up Mr. P's electric appliance setting requirements in a local user identity registration form. For example, a water heater is required to release hot water to prepare for a bath, and a piece of light music needs to be played for relaxing intense nerves. Then the SIM card identification device will control the water heater and stereo equipment to execute corresponding operations.

Alternatively, if the user identity corresponding to the SIM card is not stored in the user registration form, that is, in a case that the user identity corresponding to the SIM card has not been stored in the local user registration form, the SIM card identification device may also prompt a user of the SIM card user whether it is required to make a registration in the user registration form. Therefore, the user may make a registration in the user registration form of the SIM card identification device, so that the SIM card identification device identifies the user and automatically responds to various requirements of the user.

Figure 2:
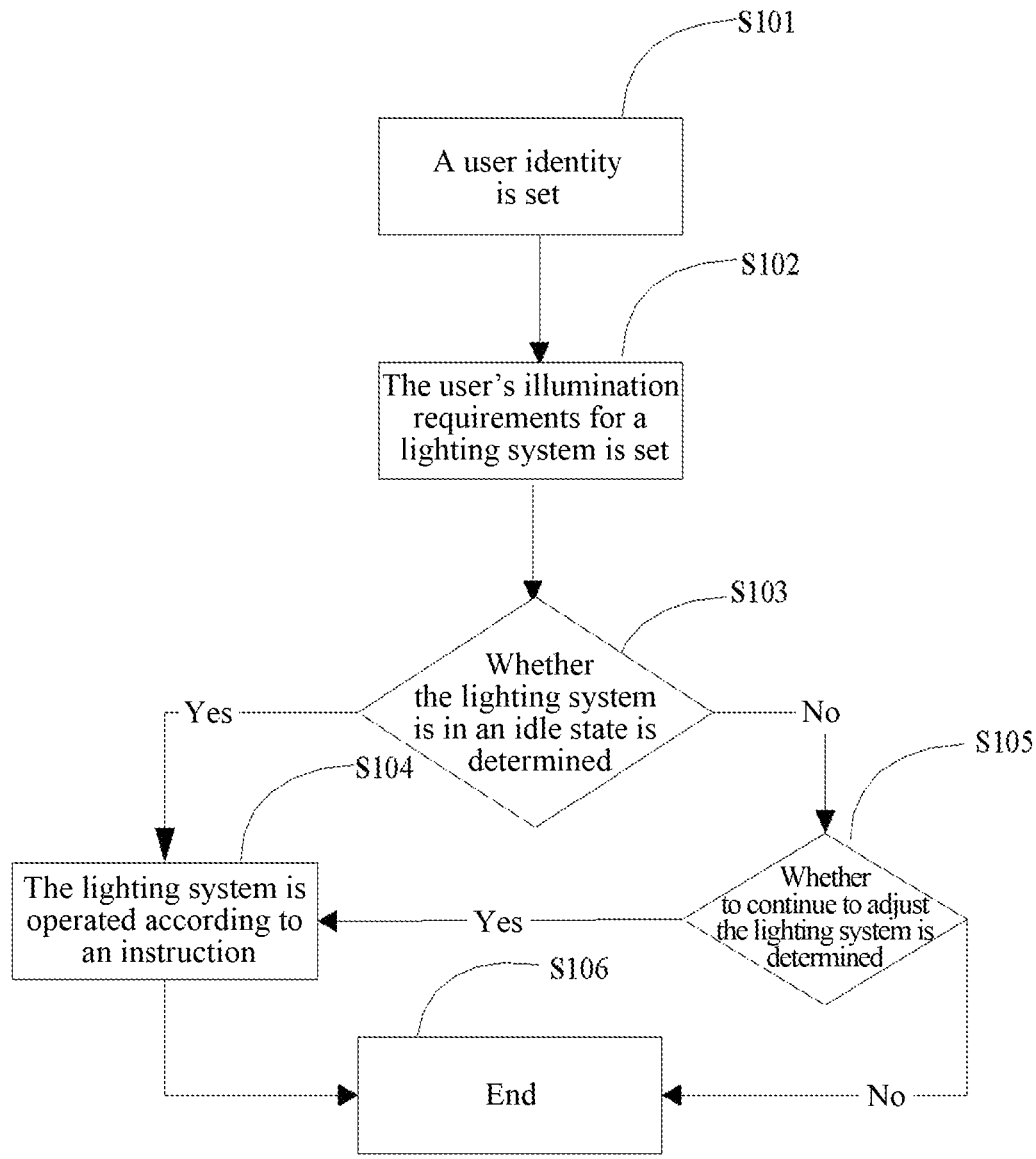
FIG. 2 is another flow chart of a method for controlling an electric appliance in a personalized way provided in an embodiment of the present disclosure.

The method for controlling the electric appliance in a personalized way provided in the present disclosure will be described in detail with the SIM card identification device operating and controlling a household lighting system as an example below. As shown in FIG. 2, the method may include the following steps.

In step S101, a user identity is set.

In the step, it is to set which users can operate the lighting system through a user management system of the SIM card identification device.

In step S102, the user's illumination requirements for the lighting system are set.

In the step, lighting devices required to be controlled are set through a device management system of the SIM card identification device. For example, luminance of various lights may be set.

In step S103, it is determined whether the lighting system is in an idle state. If the lighting system is in the idle state, the step S104 is executed. And if the lighting system is not in the idle state, the step S105 is executed.

After setting is finished, it is to determine whether the lighting system is in the idle state or has been in a working state, so as to automatically operate the lighting system according to the requirements set by the user currently after identifying the SIM card information through the SIM card identification device.

In step S104, the lighting system is operated according to an instruction.

If the user appoints that the lighting system be idle currently, that is, the lights are not turned on, the lighting system is directly operated according to the data set by the user currently.

In step S105, whether to continue to adjust the lighting system is determined.

If the lighting system has been in the working state at present, it is to judge whether to continue to operate the lighting system according to user settings. If the lighting system has been in the working state, the step S104 is executed, and if the lighting system has not been in the working state, the step S106 is executed.

In step S106, the procedure ends.

Figure 3:
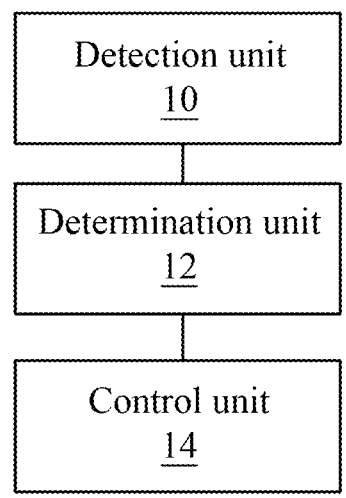
FIG. 3 is a schematic diagram of a structure of an apparatus for controlling an electric appliance in a personalized way provided in an embodiment of the present disclosure.

Accordingly, as shown in FIG. 3, an embodiment of the present disclosure also provides an apparatus for controlling an electric appliance in a personalized way, which includes:

a detection unit 10, arranged to detect whether a wireless signal carrying subscriber identity module SIM card information exists in a preset range;

a determination unit 12, arranged to, in a case that the wireless signal carrying the SIM card information exists, determine a user identity of an SIM card according to the SIM card information; and a control unit 14, arranged to correspondingly control the electric appliance according to the user identity.

With the apparatus for controlling the electric appliance in a personalized way provided in the embodiment of the present disclosure, the detection unit 10 and the determination unit 12 may authenticate the user identity by using an identity identification function of the SIM card, the control unit 14 may correspondingly control the electric appliance according to different user identities. Therefore, when entering a room or car, the user may automatically enjoy his/her own favorite music and lights and the like and enjoy appropriate temperature, which makes people pleased, thereby effectively improving the user experience.

In the embodiment, the SIM card identification device installed in a family or car may detect whether the wireless signal carrying the SIM card information exists in the preset range (e.g., in a range of one family or in a car and so on), thus the user identity may also be authenticated.

Alternatively, the detection unit 10 may be arranged to detect whether the wireless signal carrying the SIM card information exists in the preset range by communicating with a base station of a cell; or the detection unit 10 may also be arranged to: when a user makes or answers calls, detect whether the wireless signal carrying the SIM card information exists in the preset range by detecting a communication message transmitted in a wireless channel.

In a case that the SIM card identification device detects that the wireless signal carrying the SIM card information exists in the preset range, the determination unit 12 may determine the user identity of the SIM card according to the SIM card information, for example, the determination unit 12 may determine different user identities corresponding to different SIM cards according to an international mobile subscriber identity number of the SIM card or a mobile phone number. Therefore, the SIM card identification device may perform valid authentication on the user identity through the SIM card information, which avoids complicated algorithms such as fingerprint recognition or facial recognition to be used.

Specifically, the control unit 14 may be arranged to: determine whether the user identity corresponding to the SIM card has been stored in a local user registration form; in a case that the user identity corresponding to the SIM card has been stored in the local user registration form, look up an electric appliance setting requirement corresponding to the user identity in the user registration form; and control a corresponding electric appliance according to the electric appliance setting requirement.

Alternatively, the control unit 14 may also be arranged to: in a case that the user identity corresponding to the SIM card has not been stored in the local user registration form, prompt the user of the SIM card whether it is required to make a registration in the user registration form. Therefore, the user may make a registration in the user registration form of the SIM card identification device, so that the SIM card identification device identifies the user and automatically responds to various requirements of the user.

The embodiment of the present disclosure also provides a computer program, which includes program instructions, herein, when the program instructions are executed by an SIM card identification device, the SIM card identification device may execute the above method.

The embodiment of the present disclosure also provides a carrier carrying the above computer program.

Though the preferred embodiments of the present disclosure have been disclosed for the purpose of illustration. One skilled in the art will realize that various improvements, additions and replacements are also possible. Therefore, the scope of the present disclosure should not be limited to the above embodiments.

INDUSTRIAL APPLICABILITY

With the method and apparatus for controlling the electric appliance in a personalized way, the computer program and the carrier carrying the computer program, the user identity may be authenticated by using an identity identification function of the SIM card, and the electric appliance may be correspondingly controlled according to different user identities, therefore, when entering a room or car, the user may automatically enjoy his/her own favorite music and lights and the like and enjoy appropriate temperature, which makes people pleased, thereby effectively improving the user experience.

What is claimed is:

1. A method for controlling an electric appliance in a personalized way, comprising:

detecting whether a wireless signal carrying Subscriber Identity Module, SIM, card information exists in a preset range;

in a case that the wireless signal carrying the SIM card information exists, determining a user identity of an SIM card according to the SIM card information; and controlling an electric appliance according to the determined user identity; wherein, the step of correspondingly controlling the electric appliance according to the determined user identity comprises:

determining whether the user identity corresponding to the SIM card has been stored in a local user registration form;

in a case that the user identity corresponding to the SIM card has been stored in the local user registration form, looking up an electric appliance setting requirement corresponding to the user identity in the user registration form; and controlling a corresponding electric appliance according to the electric appliance setting requirement.

2. The method according to claim 1, wherein, the step of detecting whether a wireless signal carrying SIM card information exists in a preset range comprises:

detecting whether the wireless signal carrying the SIM card information exists in the preset range by communicating with a base station of a cell; or when a user makes or answers calls, detecting whether the wireless signal carrying the SIM card information exists in the preset range by detecting a communication message transmitted in a wireless channel.

3. The method according to claim 1, wherein, the step of in a case that the wireless signal carrying the SIM card information exists, determining a user identity of an SIM card according to the SIM card information comprises:

determining different user identities corresponding to different SIM cards according to an International Mobile Subscriber Identity, IMSI, of the SIM card.

4. The method according to claim 1, after determining whether the user identity corresponding to the SIM card has been stored in a local user registration form, further comprising:

in a case that the user identity corresponding to the SIM card has not been stored in the local user registration form, prompting an user of the SIM card whether it is required to make a registration in the user registration form.

5. An apparatus for controlling an electric appliance in a personalized way, comprising hardware performing instructions stored in a non-transitory computer readable medium which executes steps in following units:

a detection unit, arranged to detect whether a wireless signal carrying subscriber identity module, SIM, card information exists in a preset range;

a determination unit, arranged to, in a case that the wireless signal carrying the SIM card information exists, determine a user identity of an SIM card according to the SIM card information; and a control unit, arranged to control an electric appliance according to the user identity; wherein, the control unit is arranged to:

determine whether the user identity corresponding to the SIM card has been stored in a local user registration form;

in a case that the user identity corresponding to the SIM card has been stored in the local user registration form, look up an electric appliance setting requirement corresponding to the user identity in the user registration form; and control a corresponding electric appliance according to the electric appliance setting requirement.

6. The apparatus according to claim 5, wherein, the detection unit is arranged to:

detect whether the wireless signal carrying the SIM card information exists in the preset range by communicating with a base station of a cell; or when a user makes or answers calls, detect whether the wireless signal carrying the SIM card information exists in the preset range by detecting a communication message transmitted in a wireless channel.

7. The apparatus according to claim 5, wherein, the determination unit is arranged to determine different user identities corresponding to different SIM cards according to an International Mobile Subscriber Identity, IMSI, of the SIM card.

8. The apparatus according to claim 5, wherein, the control unit is further arranged to:

in a case that the user identity corresponding to the SIM card has not been stored in the local user registration form, prompt a user of the SIM card whether it is required to make a registration in the user registration form.

9. A non-transitory computer readable medium, carrying computer program, wherein the computer program comprising program instructions, wherein, when the program instruction are executed by an SIM card identification device, the SIM card identification device executes the method according to claim 1.

* * * * *